United States Patent [19]

Bailey

[11] Patent Number: 5,735,025
[45] Date of Patent: Apr. 7, 1998

[54] ERGONOMIC RECESSED RELEASE SAFETY HOOK

[75] Inventor: James T. Bailey, Greenwood, Ark.

[73] Assignee: United States Forgecraft Corporation, Fort Smith, Ark.

[21] Appl. No.: 718,768

[22] Filed: Sep. 25, 1996

[51] Int. Cl.⁶ ............................ A44B 13/02; B66C 1/36; F16B 45/02
[52] U.S. Cl. ............................ 24/600.1; 294/82.2
[58] Field of Search .................. 24/599.1, 599.5, 24/599.7, 598.2, 598.4, 600.1, 369, 370; 294/82.2, 82.19, 82.17

[56] References Cited

U.S. PATENT DOCUMENTS

| 731,162 | 6/1903 | Carter | 24/600.1 |
|---|---|---|---|
| 1,363,873 | 12/1920 | Hokanson | 24/600.1 |
| 1,521,811 | 1/1925 | Hartbauer | 24/600.1 X |
| 1,879,168 | 9/1932 | Freysinger | 24/600.1 |
| 1,964,428 | 6/1934 | Duffy | 24/600.1 |
| 2,490,931 | 12/1949 | Thompson | 24/599.5 |
| 3,575,458 | 4/1971 | Crook et al. | 294/82.2 |
| 3,831,994 | 8/1974 | Martin | 24/600.2 X |
| 4,122,585 | 10/1978 | Sharp et al. | 24/600.1 X |
| 4,358,880 | 11/1982 | Garcia | 24/600.2 |
| 4,539,732 | 9/1985 | Wolner | 24/600.2 |
| 4,977,647 | 12/1990 | Casebolt | 24/599.5 |
| 5,257,441 | 11/1993 | Barlow | 24/600.1 |
| 5,361,464 | 11/1994 | Bunnell | 24/600.1 X |
| 5,579,564 | 12/1996 | Rullo et al. | 24/600.1 X |

*Primary Examiner*—Peter M. Cuomo
*Assistant Examiner*—Robert J. Sandy
*Attorney, Agent, or Firm*—Stephen D. Carver

[57] ABSTRACT

An ergonomic snap hook that employs a recessed release to prevent undesirable unfastening. The snap hook uses a redundant locking gate that must be operated in a predetermined sequence to permit latch opening. Once the latch is opened, a rope or the like may be inserted into the hook to secure the user thereto. The snap hook is fastened to a supporting belt or strap which, in turn, is connectable, by the hook, to a body belt worn by the linemen. A spring biased, recessed gate prevents latch movement until the gate is released. Preferably, the gate mounts opposite of the latch. To unfasten the latch, the user first depresses the gate to align a follower on the latch with a slot opening on the gate. Subsequent follower movement along the slot coincides with latch release. The followers on the latch clean the slots on the gate as they move along them. The latch may then be opened by applying an appropriate pressure or force against the latch biasing spring. The gate may be easily manipulated with one hand. The body of the hook is shaped so that the user may easily position it in one hand. An ergonomic, thumb rest assists the user in manipulating the gate by providing a convenient pivot point for the thumb terminus.

17 Claims, 5 Drawing Sheets

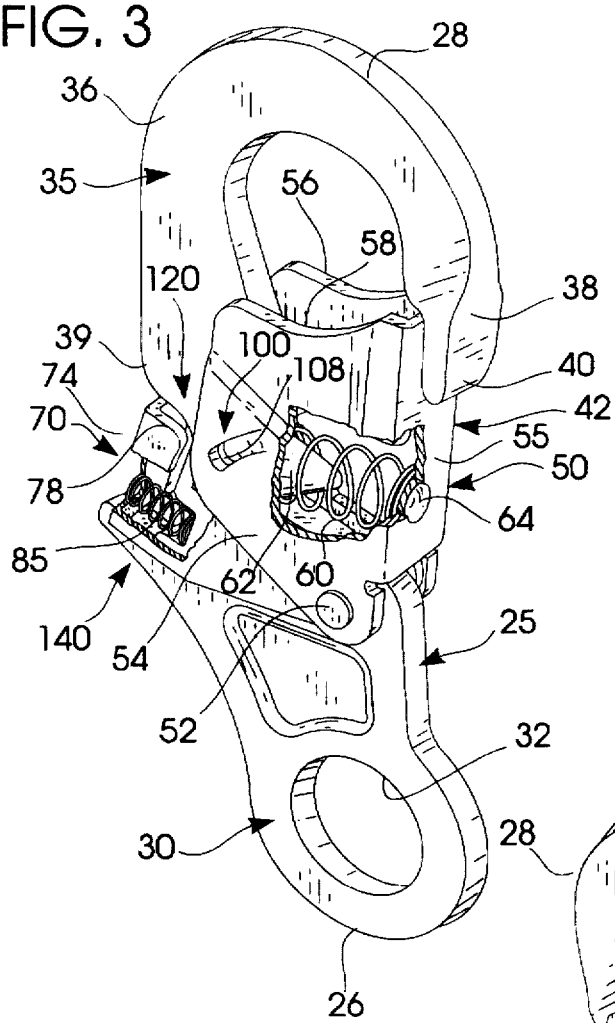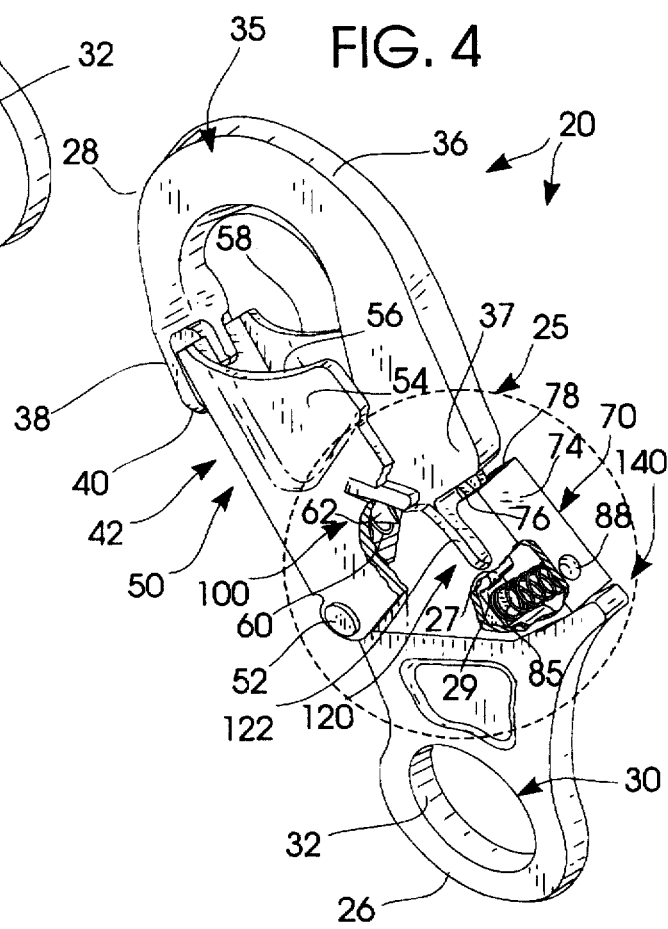

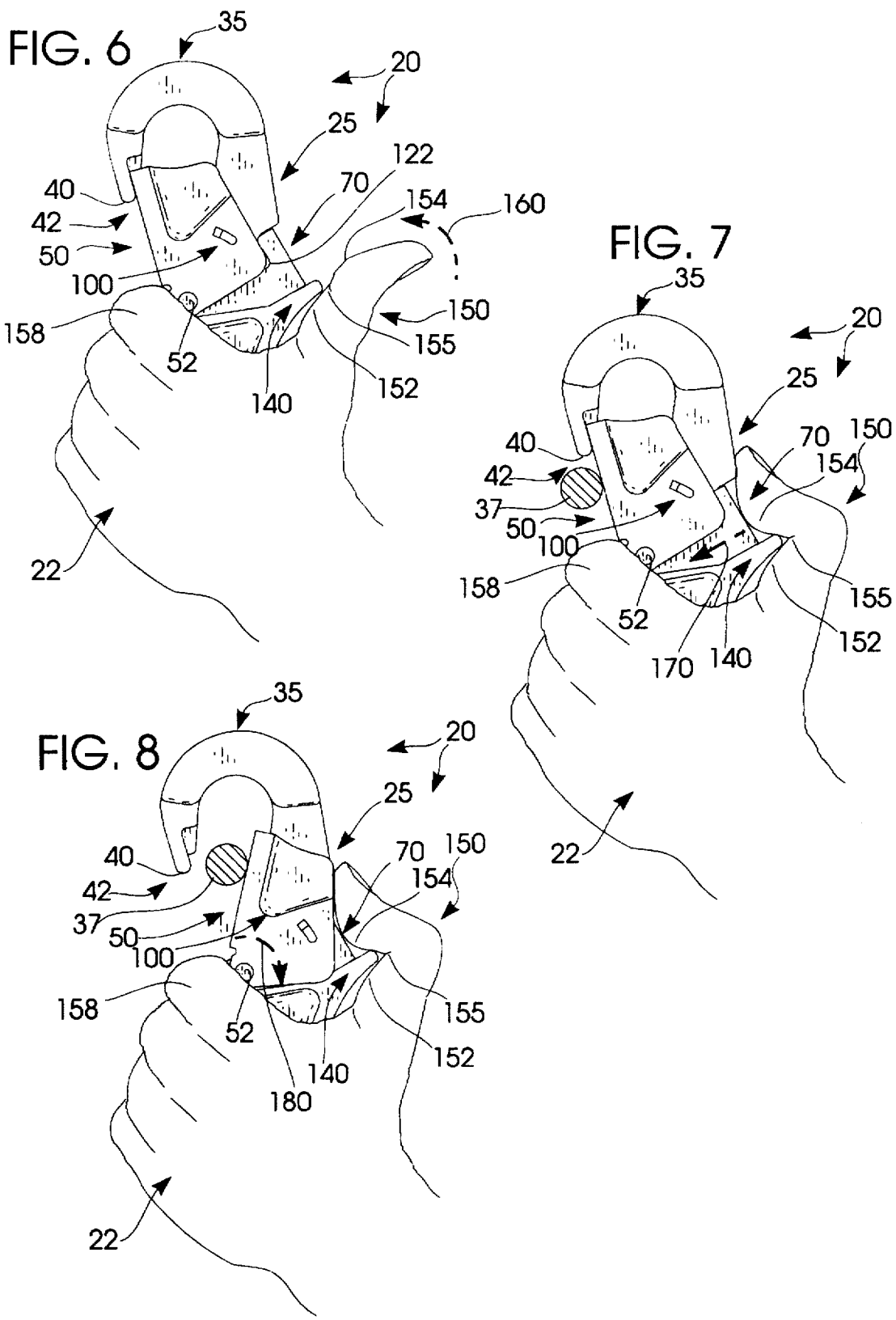

ERGONOMIC RECESSED RELEASE SAFETY HOOK

BACKGROUND OF THE INVENTION

1. Field of the Invention

The invention generally relates to locking snap hooks that anchor or retain safety harnesses, load supports, lanyards, and the like. More particularly, the present invention is directed to a safety snap hook with a self-cleaning, ergonomic recessed release. Known prior art may be found in U.S. Class 24, subclass 599 and other subclasses thereunder.

2. Description of the Prior Art

Various locking snap hooks are known in the prior art. As is understood and appreciated by those with skill in the art, safety snap hooks are often used by persons engaged in high altitude activities, such as mountain climbing, window washing, construction activities or the like to prevent undesirable falls. These locking snap hooks vary in complexity from a simplistic climbing loops to more complex triple locking safety hooks similar to the present invention.

Simple climbing loops employ a relatively primitive design that makes them easy to use and simple to manufacture. However, their single latch makes them unreliable and subject to catastrophic failure. On the other hand, redundant latching hooks generally function more reliably but they are more difficult to operate. Thus, it is desirable to combine the safety features of redundant snap hooks with the simplicity of single latch systems to increase user satisfaction.

Consequently, most known prior art snap hooks employ double locking mechanisms to ensure that the primary latch remains fastened securely. Current prior art in the field, for example, includes U.S. Pat. No. 1,879,168 to John B. Freysinger for an invention relating to snap hooks. The snap hook described therein has a hook shank provided with a throat, a pivoted spring-pressed latch for closing the throat, and means for locking the latch against accidental opening movement. The locking means is generally in the form of a lever "C" pivoted to the rear edge of the shank.

Similar examples are disclosed in a number of other patents, such as U.S. Pat. No. 2,490,931 to Thompson for a self-locking linemen's body belt device; U.S. Pat. No. 3,831,994 to Robert Martin for a safety hook and U.S. Pat. No. 4,122,585 to Sharp, et al. for a single-action double-lock snap. Other prior art includes U.S. Pat. No. 4,358,880 to Garcia for a quick release snap; U.S. Pat. No. 4,539,732 to Wolner for a double locking safety snap; and U.S. Pat. No. 4,977,647 to S. C. Casebolt for a double locking snap hook, all of general relevancy.

An advantage with double locking snap hooks is that they are less likely to unlatch and open catastrophically. A multiple redundancy, highly reliable prior art snap hook known to this inventor is shown in U.S. Pat. No. 5,257,441 issued Nov. 2, 1993, to Barlow. A triple locking snap hook is disclosed that positively insures reliable, fail-safe fastening. However, notwithstanding the high degree of reliability exhibited by the latter device, some users object to the slightly increased difficulty of use.

Furthermore, most known redundant locking snap hooks utilize protruding releases that may aggravate the risk of failure. Sometimes protruding releases that are meant to be human-activated are accidentally activated when snagged by lines, ropes, passing obstructions or the like. Snap hooks using redundant activators establishing multiple pivot points have a relatively greater number of moving parts, increasing costs and complicating assembly. However, a desirable snap hook must have some structure to insure secured fastening of the latch. Desirable devices must also be simple for a user to manipulate. Known prior art devices are often unwieldy, often requiring two hands to deploy properly.

Another problem with known prior art snap hooks involves the gate-to-latch release mechanism. If such a hook is mistreated or damaged or allowed to rust or corrode, the follower and slot that release the latch may get stuck. This problem can also arise if dirt or obstructions block the follower slot, subsequently preventing the follower from sliding along the slot to release the latch. As a result, the snap hook will safely remain hooked to the attachment point, but subsequent disconnection may be difficult.

Thus, it is desirable to produce a snap hook that reliably mitigates these factors. An improved design would rely upon only one pivot point for latching and locking to prevent failure. Furthermore, the self cleaning follower end slot would enhance the reliability of the snap hook. Of course, such a device must be easy to manufacture and cost effective to produce.

SUMMARY OF THE INVENTION

The present invention overcomes the above referenced problems with the known prior art. The instant snap hook employs a recessed release to prevent undesirable unfastening. Preferably, the snap hook uses a redundant locking gate that must be operated in a predetermined sequence to permit latch opening. Once the latch is opened, a rope or the like may be inserted into the hook to secure the user thereto.

The snap hook may be used for any number of purposes. The invention may be used by linemen, window washers, and similar workmen for securing themselves against accidental falls. It is particularly well adapted for use by any person who is required to work at a distance above the ground. For example, a linemen for telephones, telegraph or electric light and power company, the snap hook hereof is fastened to a supporting belt or strap which, in turn, is connectable, by said hook, to a body belt worn by the linemen.

A spring biased, recessed gate prevents latch movement until the gate is released. Preferably, the gate mounts on the opposite side of the snap hook from the latch. To unfasten the latch, the user first depresses the gate to align a follower on the latch with a slot opening on the gate. Subsequent follower movement along the slot coincides with latch release. The latch may then be opened by applying an appropriate pressure or force against the latch biasing spring.

In the preferred embodiment, the recessed release gate that permits the hook to be readily released may be easily manipulated with one hand. In other words, the body of the hook is shaped so that the user may easily position it in one hand. An ergonomic, thumb rest assists the user in manipulating the gate by providing a convenient pivot point for the thumb terminus. Preferably, the followers on the latch clean the slots on the gate as they move along them.

The locking snap hook disclosed herein provides a safety hook having a latch engageable by a recessed release gate for reliable and efficient locking function. The snap hook employs a latch and a gate that are movable sequentially so that the gate first releases the latch for the insertion of a connector ring of another snap hook, lanyard, or the like.

Thus, the locking snap hook is protected from the accidental opening of the latch from a closed position to an open position as a result of the sequential movement of the gate and the subsequent opening of the latch while permitting the user to manipulate the snap hook with a single hand. Of course, the instant snap hook is economical to manufacture. Its durable construction means that the wear and tear from constant daily use will not deteriorate the quality and the safety of the device.

Thus, a principal object of the present invention is to provide a snap hook that remains securely fastened.

Another object of the present invention is to provide a snap hook with redundant fastening.

A related object of the present invention is to provide a snap hook that resists undesirable unlatching.

Yet another basic object of the invention is to provide a snap hook with a recessed release that does not snag on passing objects.

Another object of the present invention is to provide a snap hook of the character described herein that may be easily manipulated by a single person.

A related object is to provide a snap hook with opposing release mechanisms.

Another primary object is to provide a snap hook with a snag resistant periphery.

A basic object of the present invention is to provide a snap hook that promotes user comfort.

Another related object is to provide a snap hook with a single pivot point to promote reliability.

A related object is to provide a snap hook that increases operating efficiency.

Another basic object of the present invention is to provide a snap hook with a reliable redundant gate. It is a feature of the present invention that the gate uses a self-cleaning follower to ensure reliable operation.

These and other objects and advantages of the present invention, along with features of novelty appurtenant thereto, will appear or become apparent in the course of the following descriptive sections.

BRIEF DESCRIPTION OF THE DRAWING

In the following drawings, which form a part of the specification and which are to be construed in conjunction therewith, and in which like reference numerals have been employed throughout wherever possible to indicate like parts in the various views:

FIG. 3 is a partially fragmented view similar to FIG. 1, with portion omitted or broken away for clarity;

FIG. 4 is a partially fragmented view similar to FIG. 2, with portion omitted or broken away for clarity;

FIG. 6 is a reduced scale pictorial view showing operation;

FIG. 7 is a reduced scale pictorial view similar to FIG. 6 with the release depressed; and, FIG. 8 is a reduced scale pictorial view similar to FIGS. 6 and 7 showing the release depressed and the latch rotated to open the hook.

DETAILED DESCRIPTION

Figure 1:
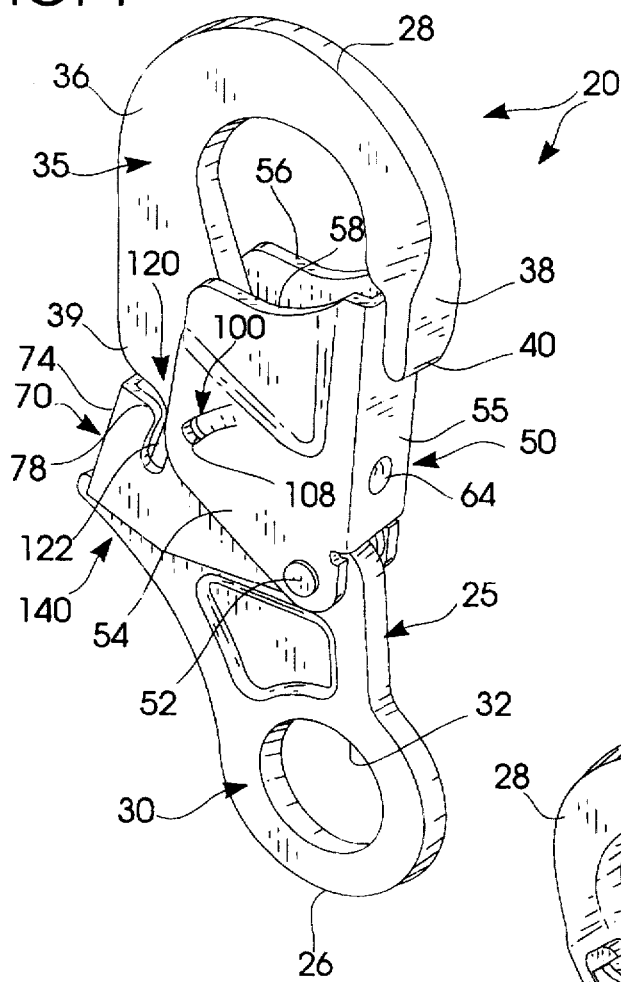
FIG. 1 an isometric view of a preferred embodiment of my Ergonomic Recessed Release Snap Hook showing the best mode.
Figure 2:
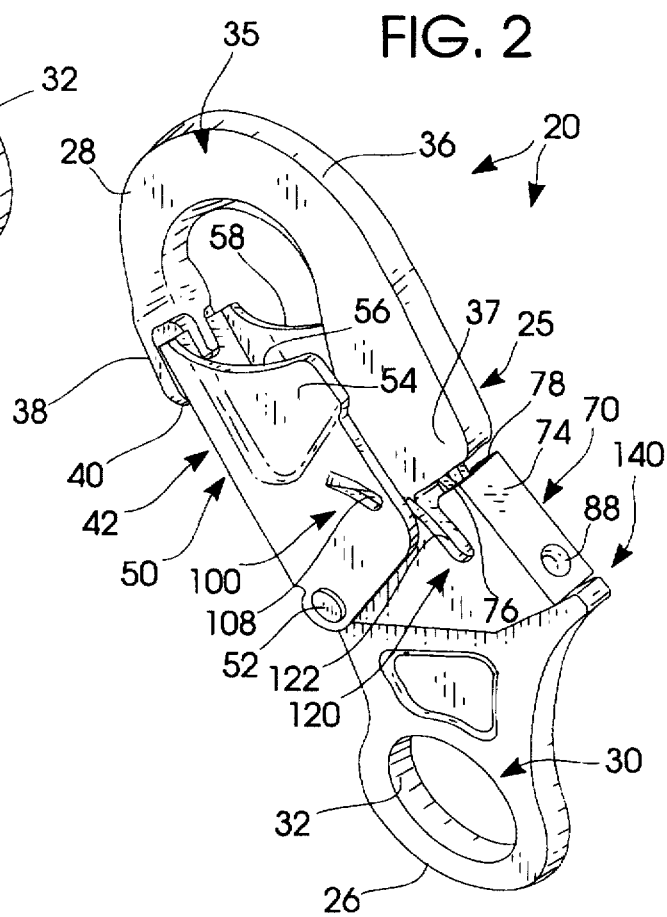
FIG. 2 is an isometric view of the invention, taken generally from the opposite side of FIG. 1.

Referring more specifically to the drawings, my snap hook is generally designated with reference numeral 20 in FIGS. 1–8. Snap hook 20 can be attached to hoist cables, lanyards, or the like, to couple cables or lanyards to the hook body 25 (FIG. 1). The snap hook 20 generally secures the user via an integral connector ring 30 at one end 26 and a distal hook 35 at the opposite end 28. At end 26, integral connector ring 30 defines an eyelet 32 formed therethrough. Eyelet 32 provides an attachment point for lines to the user, such as a lanyard or the like (not shown).

The hook 35 comprises an arcuate arm 36 protruding outwardly from body 25. During use, the user 22 simply hooks arm 36 onto objects, such as safety cable 37 (FIGS. 7–8). A tip 40 is defined at the terminal arm end 38. The arm 36 and tip 40 define a generally C-shaped hook 35. The spaced apart arm base 39 and the tip 40 are separated by a mouth 42 of the hook 35.

The main locking mechanism for the snap hook 20 consists of a locking latch 50 that is pivotally secured to the body 25. In other words, latch 50 swings about pivot pin 52. Pin 52 penetrates an orifice 52A on each side of latch 50 and another orifice 52B on arm base 39. Latch 50 may move pivotally from a closed position against the arm tip 40 (FIGS. 1–7) to an open position against the arm base 39 (FIG. 8). Preferably, latch 50 is spring biased to normally press against tip 40 to bridge mouth 42. Preferably, the longitudinal axis of the exterior latch face 55 is coaxial to the longitudinal axis of tip 40.

Tip 40 further comprises a projecting ridge 41. Latch 50 defines a notch 51 that receives ridge 41 to appropriately seat latch 50 against tip 40. The alignment of the ridge 41 and notch 51 establishes a seated configuration to prevent the latch 50 from becoming disengaged when a harness, lanyard, or the like, accidentally exerts pressure in a direction transverse from the pivot direction. The ridge 41 thus received along the notch 51 creates means to substantially prevent undesired movement.

Figure 5:
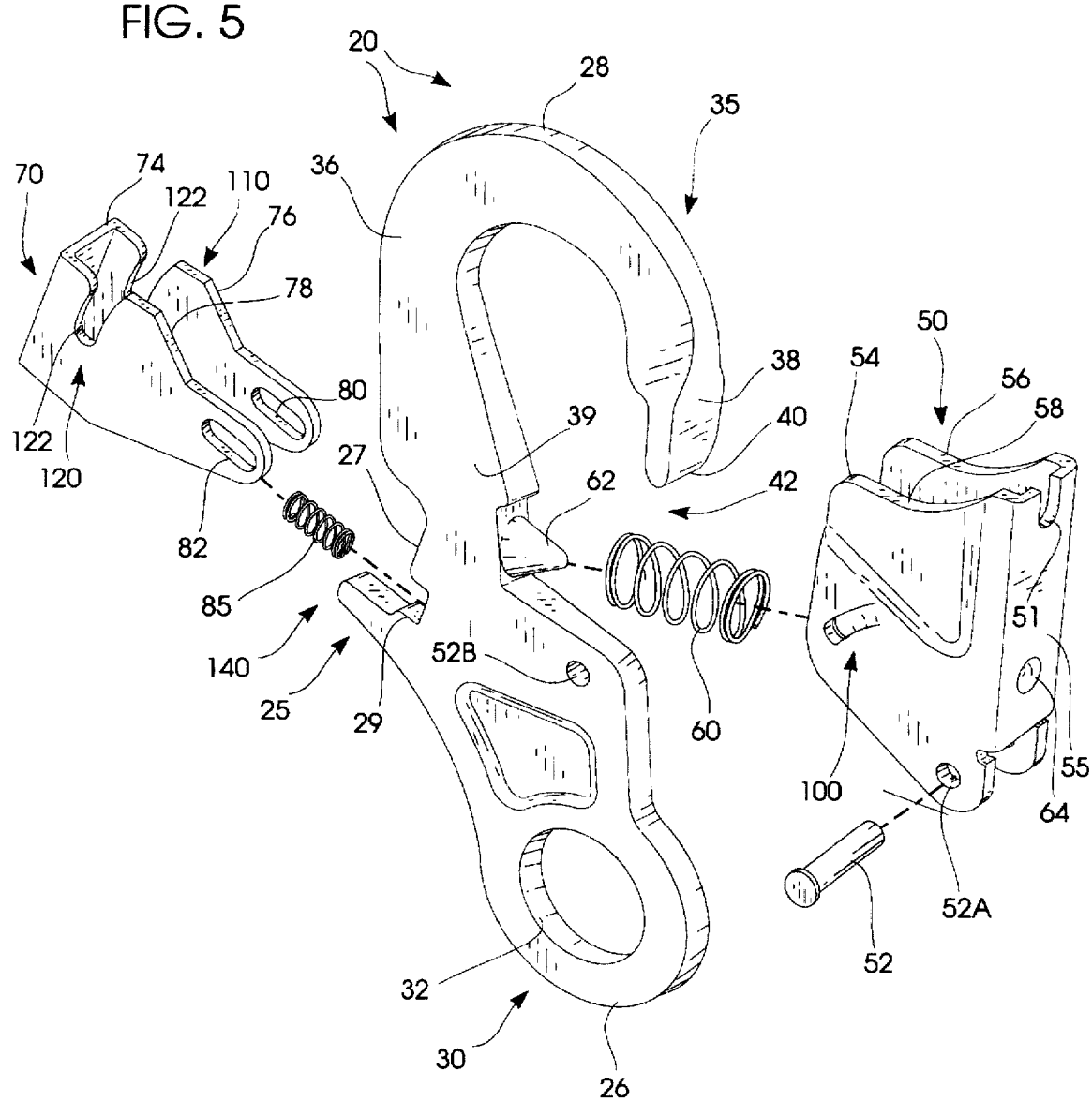
FIG. 5 is an exploded isometric view of the invention.

Latch 50 includes a bifurcated frame 54 with opposite sidewalls 56, 58 which straddle the arm 36. A biasing spring 60 is contained within the latch frame 54. Spring 60 urges the latch 50 into a locked engagement position against tip 40 (FIG. 5). Spring 60 is seated on a cone 62 on base 39. The other spring end pushes against latch 50 at detent 64 to thereby drive the latch 50 into tip 40.

In one preferred embodiment, when latch 50 is in the locked position, it remains interiorly of the outermost, exterior plane established by the exterior surfaces of the tip 40 and ring 30.

Latch 50 is locked into the seated configuration by a pivoting gate 70. Preferably, gate 70 is also secured by pin 52. Gate 70 is most preferably located directly opposite the latch 50 along the arm base 39. The body 25 has a recessed indentation 27 that allows movement of the sliding gate 70 to release latch 50, as will be discussed more thoroughly hereinafter.

Gate 70 is similar to latch 50 with a bifurcated frame 74 and corresponding sidewalls 76, 78 that straddle arm base 39. However, gate 70 does not pivot about pin 52 as latch 50 does. Instead, gate 70 slides inwardly into indentation 27 along grooves 80, 82 as opposed to the rotary movement of latch 50. A spring 85 biases gate 80 outwardly. In the preferred embodiment, spring 85 does not need to be as large as spring 60. One end of spring 85 is captivated in notch 29 by frame 74. The other spring end pushes against detent 88 to bias gate 70 outwardly.

In one preferred embodiment, even when gate 70 is at its outermost position, it remains recessed beneath the plane established by the body 25. Thus, gate 70 is protected from being snagged or otherwise harmed by passing objects such as other lines, cables, etc.

Figure 4A:
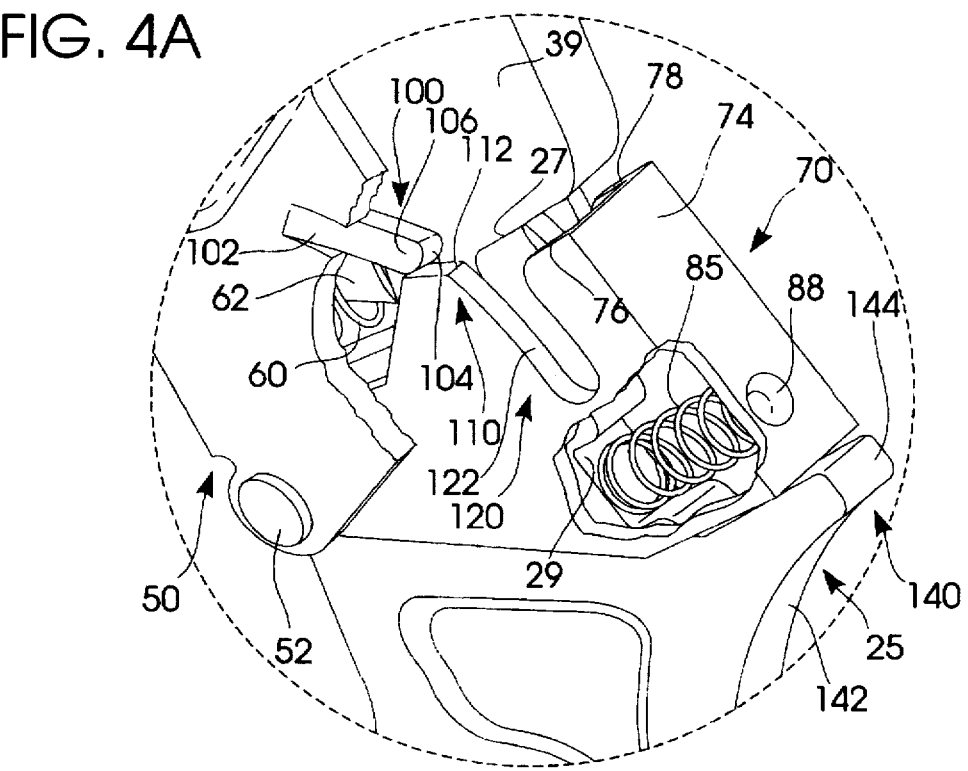
FIG. 4A is an enlarged, partially fragmented view of the encircled portion of FIG. 4, with portions omitted or broken away for clarity.
Figure 4B:
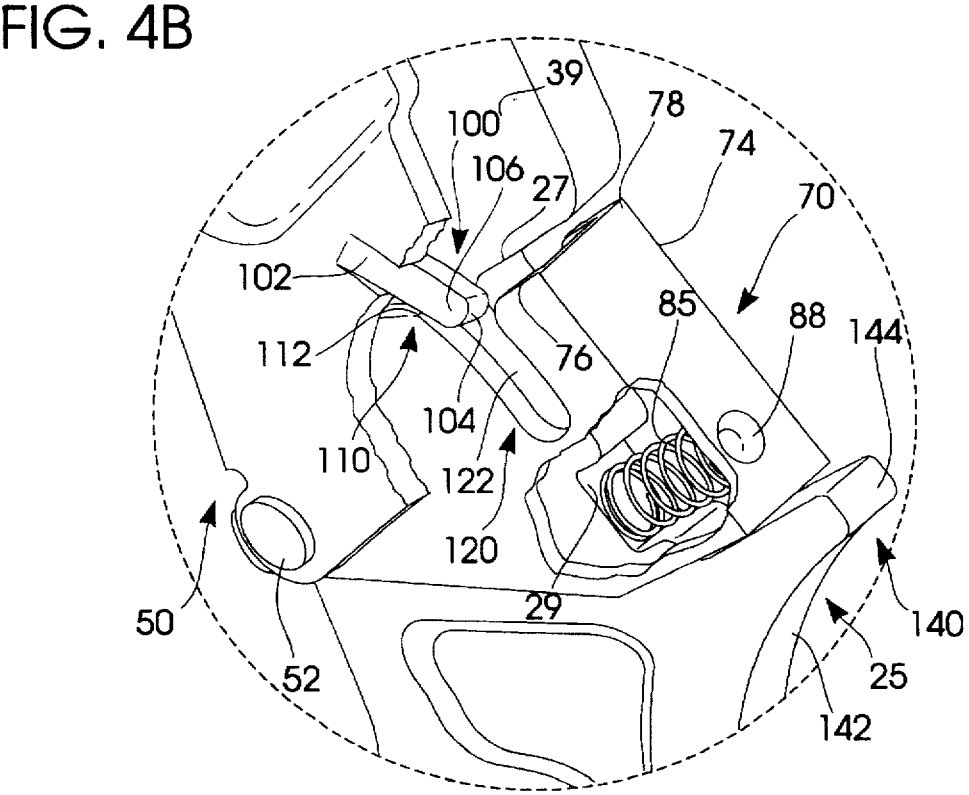
FIG. 4B is an enlarged, partially fragmented view of the encircled portion of FIG. 4 similar to FIG. 4A but showing a moved position, with portions omitted or broken away for clarity.

With gate 70 at its outermost position, latch 50 is locked in place by a pair of follower 100 and clearance slot 120 combinations (FIGS. 4A–4B). Each follower 100 comprises an integral, inwardly projecting tongue 102 on the interior surface of a sidewall 56 or 58. Each clearance slot 120 comprises a groove 122 defined on each gate sidewall 76, 78 (FIGS. 4A–4B).

Preferably, tongue 102 has a rounded head 104 to facilitate sliding movement. A rising ramp 106 runs from head 104 to the exterior surface of each respective sidewall 56, 58. Ramp 106 lifts and removes debris and similar materials from the head 104 to the exterior of latch 50. Thus, as the tongue 102 and head 104 enter and move along groove 122, debris or other materials residing therein are removed therefrom. Debris moved along ramp 106 exits to the exterior via pathway 108.

When latch 50 is locked, tongue 102 is forced against a retaining ledge 110 adjacent clearance slot 120. A flat lip 112 secures tongue 102. In order to unlock the gate 70, it must be depressed inwardly to release tongue 102 from ledge 110.

The snap hook 20 is shown as a typical, flat unit of the type commonly used on safety equipment. It is normally made of forged steel to attain maximum strength for its size. The principles contained in this teaching may be employed to various sizes of snap hooks as is conventionally used. All pivots as disclosed in this invention show a rivet means, although all of the various fastening means such as brads and the like may be used.

OPERATION

Sliding gate 70 may be depressed by the user with only one hand (FIGS. 6–8). To efficiently manipulate the snap hook 20, the gate 70 must be depressed and then the latch 50 moved inwardly in a sequential single action. The user simply places a thumb along thumb rest 140. Preferably, the last two digits of the thumb lie adjacent rest 140. The inward digit 152 rests along the top rest surface 142. The terminal digit 154 preferably extends above the rest terminus 144. Preferably, the digit junction 155 lies adjacent terminus 144. The last digit is then pivoted about junction 155 (as shown by arrow 160 in FIG. 6) and terminus 144 to accurately and efficiently depress gate 70 inwardly into indentation 29 (as shown by arrow 170 in FIG. 7).

When the sliding gate 70 is thus fully depressed into the indentation 29, the follower 100 may slide into clearance slot 120 as the head 104 clears ledge 122. The movement of follower 100 along slot 120 disengages the latch 50 from the locked position. Latch 50 is thus free for pivotal movement (shown by arrow 180 in FIG. 8). The pivoting movement of the latch 50 may occur when sufficient force is applied to overcome the last remaining locking mechanism in the form of coil spring 60. Once gate 70 has been depressed, latch 50 may be easily opened and rope 29 inserted into hook 35. The invention particularly lends itself to the common practice of striking fixed objects, such as rope 29, with latch 50 to quickly and accurately attach snap hook 20 thereto (FIGS. 7–8). Alternatively, when the latch 50 is depressed sufficiently, a connector ring 32 of another snap hook 20 may be inserted or, in the alternative, a lanyard or the like may be hooked and placed in the mouth 42 for engagement.

The unlocking of the snap hook 20 may also be accomplished by a single hand which makes this unique invention especially attractive. The user simply depresses gate 70 and presses inwardly against latch 50 with forefinger 158.

During use, both the latch 50 and the gate 70 remain beneath the exterior planes generally established by the body 25. Consequently, they are substantially protected from destructive contact by foreign objects. Since the latch 50 pivots about pin 52 and the gate 70 slides along pin 52, it is believed that the likelihood of pivot failure is reduced substantially. As a result of these improvements, the present invention is believed to operate more reliably than the known prior art.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A safety snap hook comprising:

a body comprising an arcuate hook at one end thereof and integral load supporting means protruding from the other end for connection to a load, said hook comprising an arm having a base and a spaced apart tip, said tip and said base separated by a mouth, and ergonomic thumb rest means for enhancing user manipulation of said hook while increasing the efficiency and speed of deploying said snap hook;

a latch having one end comprising opposite integral sidewalls that pivotally straddle said arm base and an other end for selectively engaging said tip to normally close said mouth;

means for normally biasing said latch towards said closed position;

a sliding gate comprising opposite integral sidewalls that straddle said arm interiorly of said latch sidewalls to normally prevent said latch from becoming disengaged from said tip when in said closed position;

means for normally biasing said gate to a locked position;

pin means penetrating said arm and both of said latch and said gate, said pin means permitting pivotal displacement of said latch while slidably captivating said gate; and, follower means establishing blocking contact between said latch and said gate for normally blocking said latch to prevent undesirable pivotal displacement of said latch, said follower means comprising a pair of tongues in said latch projecting inwardly from said latch sidewalls towards said arm and towards said gate and normally contacting a retaining ridge on said gate to prevent latch movement.

2. The safety snap hook as defined in claim 1 wherein said gate comprises groove means penetrated by said pin means for enabling said gate to be slidably displaced towards said latch to unblock the latch.

3. The safety snap hook as defined in claim 2 wherein, during opening of said latch, said latch tongues are pivoted into slidable captivation within clearance slot means defined in said gate sidewalls.

4. The safety snap hook as defined in claim 3 wherein said clearance slot means comprises a receptive slot defined in each gate sidewall.

5. The safety snap hook as defined in claim 4 wherein each of said tongues comprises a sloped ramp adapted to force trapped debris in each of said slots to move upwardly and outwardly through a pathway to the exterior of said latch.

6. A safety snap hook comprising:
 a body comprising an arcuate hook at one end thereof and integral load supporting means protruding from the other end for attaching a load, said hook comprising an arm having a base and a spaced apart tip, said tip and said base separated by a mouth;
 a latch having one end pivotally mounted on said arm base and the other end free for selective engagement with said tip to close said mouth into a closed position or to open said mouth into an open position, said latch normally biased into said closed position, said latch comprising:
  a bifurcated frame with opposite sidewalls that straddle said arm;
  biasing spring means contained within said bifurcated frame urging said latch against said tip when in said closed position; and,
  an elongated tongue protruding from each latch sidewall; said arm has cone means for seating said biasing spring means;
 a sliding gate mounted on said arm to prevent said latch from becoming disengaged from said tip when in said closed position, said gate having a follower adapted to slide along a groove to lock and unlock said latch, said gate comprising:
  a bifurcated frame with opposite sidewalls that straddle said arm;
  biasing spring means captivated by said last mentioned bifurcated frame for normally locking said latch in said closed position; and,
  a slot defined in each gate sidewall for receiving said latch tongue when said gate is depressed by a user;
 ergonomic support means for enhancing user manipulation of said gate while increasing the efficiency and speed of deploying said snap hook; and,
 wherein said latch has a notch at the point of engagement with said tip and said tip has a ridge adapted to seat in said notch to thereby further strengthen the engagement between said latch and said tip.

7. The safety snap hook as defined in claim 6 further comprising a retaining ledge adjacent each of said slots adapted to secure each of said tongues until said gate is depressed by a user.

8. The safety snap hook as defined in claim 7 wherein each of said tongues comprises a sloped ramp adapted to force trapped debris in each of said slots to move upwardly and outwardly through a pathway to the exterior of said hook.

9. The safety snap hook as defined in claim 6 wherein said ergonomic support means comprises an elongated, arcuate thumb rest protruding beyond said gate, said rest adapted to comfortably support a user's thumb while providing a convenient pivot point when the user manipulates said gate.

10. A safety snap hook comprising:
 a body comprising an arcuate hook at one end thereof and integral load supporting means protruding from the other end for attaching a load, said hook comprising an arm having a base and a spaced apart tip, said tip and said base separated by a mouth;
 a latch having one end pivotally mounted on said arm base and the other end free for selective engagement with said tip to close said mouth into a closed position or to open said mouth into an open position, said latch normally biased into said closed position, said latch comprising:
  a bifurcated frame with opposite sidewalls that straddle said arm;
  biasing spring means contained within said bifurcated frame urging said latch against said tip when in said closed position; and,
 a sliding gate mounted on said arm to prevent said latch from becoming disengaged from said tip when in said closed position, said gate having a follower comprising an elongated tongue protruding from each latch sidewall adapted to slide along a follower slot comprising a clearance slot defined in each gate sidewall to to permit said latch to open when said gate is depressed by a user, said gate comprising:
  a bifurcated frame with opposite sidewalls that straddle said arm; and
  biasing spring means captivated by said last mentioned bifurcated frame for locking said latch in said closed position until said gate is depressed;
 wherein said arm has cone means for seating said biasing spring means; and,
 ergonomic support means for enhancing user manipulation of said gate while increasing the efficiency and speed of deploying said snap hook, said last mentioned means comprising an elongated, arcuate thumb rest protruding beyond said gate, said rest adapted to comfortably support a user's thumb while providing a convenient pivot point when the user manipulates said gate.

11. The safety snap hook as defined in claim 10 further comprising a retaining ledge adjacent each of said slots adapted to secure each of said tongues until said gate is depressed by a user.

12. The safety snap hook as defined in claim 11 wherein each of said tongues comprises a sloped ramp adapted to force trapped debris in each of said slots to move upwardly and outwardly through a pathway to the exterior of said latch.

13. A safety snap hook comprising:
 a body comprising:
  arcuate hook portion comprising a spaced apart tip;
  integral means for supporting a load;
  a mouth proximate said tip; and,
  ergonomic thumb rest means for enhancing user manipulation of said snap hook by increasing the efficiency and speed of deployment;
 a latch pivoted to said body, said latch comprising opposite integral sidewalls that pivotally straddle said body and an opposite end for selectively engaging said tip;
 means for biasing said latch to normally close said mouth;
 a gate slidably straddling said body between said latch sidewalls to normally lock said latch;
 means for normally biasing said gate to a locked position;
 pin means penetrating said body, said latch and said gate, for pivotally mounting said latch while slidably captivating said gate; and,
 follower means establishing blocking contact between said latch and said gate when said gate is disposed in said locked position, said follower means comprising a pair of tongues projecting inwardly from said latch sidewalls towards said gate and normally contacting a retaining ridge on said gate to prevent latch movement.

14. The safety snap hook as defined in claim 13 wherein said gate further comprises groove means penetrated by said pin means for facilitating slidable gate movement.

15. The safety snap hook as defined in claim 14 wherein, during opening of said latch, said latch tongues are slidably captivated within arcuate clearance slots defined in said gate sidewalls.

16. A safety snap hook comprising:
a body comprising:
arcuate hook portion comprising a spaced apart tip;
integral means for supporting a load;
a mouth proximate said tip; and,
ergonomic thumb rest means for enhancing user manipulation of said snap hook by increasing the efficiency and speed of deployment;
a latch pivoted to said body for selectively engaging said tip to close said mouth, said latch comprising opposite integral sidewalls that pivotally straddle said body;
a gate for normally locking said latch, said gate slidably straddling said body and protectively nested within said latch;
follower means establishing blocking contact between said latch and said gate when said gate is disposed in said locked position, said follower means comprising a pair of tongues projecting inwardly from said latch sidewalls towards said gate; and,
wherein, during opening of said latch, said latch tongues slidably travel within arcuate clearance slots defined in said gate sidewalls.

17. A safety snap hook comprising:
a body comprising:
arcuate hook portion comprising a spaced apart tip;
integral means for supporting a load;
a mouth proximate said tip; and,
ergonomic thumb rest means for enhancing user manipulation of said snap hook by increasing the efficiency and speed of deployment;
a latch for selectively engaging said tip to close said mouth, said latch comprising opposite integral sidewalls that straddle said body;
a gate for normally locking said latch, said gate straddling said body and protectively nested within said latch;
pin means penetrating said latch and said gate for pivotally mounting said latch and slidably captivating said gate;
follower means establishing blocking contact between said latch and said gate when said gate is disposed in said locked position, said follower means comprising a pair of tongues projecting inwardly from said latch sidewalls towards said gate; and,
wherein, during opening of said latch, said latch tongues slidably travel within arcuate clearance slots defined in said gate sidewalls.

* * * * *